(12) United States Patent
Shimano et al.

(10) Patent No.: US 6,278,548 B1
(45) Date of Patent: Aug. 21, 2001

(54) POLARIZING DIFFRACTION GRATING AND MAGNETO-OPTICAL HEAD MADE BY USING THE SAME

(75) Inventors: Takeshi Shimano, Tokorozawa; Shigeru Nakamura, Tachikawa, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/230,040

(22) PCT Filed: Mar. 27, 1998

(86) PCT No.: PCT/JP98/01403

§ 371 Date: Jan. 19, 1999

§ 102(e) Date: Jan. 19, 1999

(87) PCT Pub. No.: WO99/50692

PCT Pub. Date: Oct. 7, 1999

(51) Int. Cl.[7] .............. G02B 27/44; G02B 5/18; G11B 7/135
(52) U.S. Cl. .......... 359/565; 566/569; 566/571; 566/576; 566/900; 369/44.12; 369/112
(58) Field of Search .................... 359/565, 566, 359/569, 571, 576, 900; 369/44.12, 110, 112

(56) References Cited

U.S. PATENT DOCUMENTS

| 5,875,167 | * | 2/1999 | Katayama | 369/112 |
| 5,914,811 | * | 6/1999 | Chen et al. | 359/569 |
| 6,046,581 | * | 4/2000 | Katayama | 359/495 |

FOREIGN PATENT DOCUMENTS

| 4-19522 | 3/1992 | (JP) | G02B/5/30 |
| 6-274927 | * | 9/1994 | (JP) . |
| 6-77351 | 9/1994 | (JP) | G11B/11/10 |

OTHER PUBLICATIONS

National Technical Report, vol. 41, No. 6, Dec. 1995, pp. 622–628. (Japanese).

"An Optical Integrated Circuit", Ohm Company, Japan 1989, H. Nishiwara, pp. 167–170 and p. 208.

"An Optical Engineering Handbook", First Edition, 1986, T. Ose, p. 175. (Japanese).

An Optical Integrated Circuit, Ohm Company, Japan 1985, First Edition, H. Nishiwara, pp. 139–142.

* cited by examiner

Primary Examiner—Cassandra Spyrou
Assistant Examiner—John Juba, Jr.
(74) Attorney, Agent, or Firm—Mattingly, Stanger & Malur, P.C.

(57) ABSTRACT

A diffraction grating having more than two kinds of mediums of a different refractive index, has a refractive index difference between the mediums dependent on an incident polarized light direction. In a sectional plane perpendicular to the direction along a grating pattern, the structure has a boundary line between the mediums periodic for the direction perpendicular to the grating pattern in a grating plane or periodic while enlarging or shrinking to the direction perpendicular to the direction along with the grating pattern in the grating plane and in a limited part of a period, the boundary line does not have a symmetrical plane perpendicular to both of the grating and the sectional plane. Accordingly, a polarized light beam status of ±nth order diffracted light beams becomes different and there is provided a diffraction grating capable of obtaining a generation signal of a magneto-optical recording medium from a difference of an optical amount of a light beam received.

24 Claims, 11 Drawing Sheets

POLARIZING DIFFRACTION GRATING AND MAGNETO-OPTICAL HEAD MADE BY USING THE SAME

BACKGROUND OF THE INVENTION

1. Field of the Invention

The present invention relates to a polarized beam splitter using a diffraction grating and a magneto-optical head using the polarized beam splitter.

2. Description of the Related Art

In general, a polarized beam splitter used for a magneto-optical head is provided by producing dielectric multi-layers of an isotropic medium having a constant refractive index regardless of an incident polarized light beam direction and putting the dielectric multi-layers together onto the slope of a triangle prism such as a polarized light prism 11 in FIG. 1. For a boundary plane of the dielectric multi-layers, a P polarized light beam (a component of linearly polarized light beam vibrating in the plane perpendicular to the boundary plane) can be transmitted 100% and a S polarized light beam (a component of linearly polarized light beam vibrating in the boundary plane) can be reflected 100%. For detecting a polarized light beam rotation in the magneto-optical recording medium by using these polarized light beams, a signal generation is performed by sloping the direction of a linearly polarized light beam of the reflection light beam by 45° for a splitting direction so that a transmission light beam has the same optical amount as reflection light beam and detecting the change of a balance between the transmission light beam and the reflection light beam along the polarized light beam rotation from a difference of a detected amount of light beam.

As another prior method described in a patent application No. 4-19522, there is provided a magneto-optical head using a specific Wollaston prism 21 and configured in a Japanese patent application No. 6-77351. This Wollaston prism 21 is provided by putting an anisotropic medium together in a specified direction of a principal axis and is configured as shown in FIG. 2. In other words, there is a light beam having the same status of polarized light beam as an incident light beam in the center and two divided polarized light beam components crossing orthogonal to both sides. A magneto-optical head can be miniaturized by packaging into a unit because three optical detectors 22, 23 and 24 can be configured in a plane by using this dividing method. It is possible to detect a magneto-optical signal from light beams on both sides and a servo signal such as a focusing signal or tracking signal from a light beam in the center.

Contrary to the polarized beam splitter of a magneto-optical head, a polarized beam splitter using a hologram is described in pages 622 through 628 of National Technical Report, Vol. 41, No. 6, 1995, and shown in FIG. 3. A light beam incident on hologram device 31 and being polarized in a specific direction transmits through without an occurrence of a diffracted light beam, becomes a rotated polarized light beam through a λ/4 board 32, reflects at a reflection substance 33, transmits through the λ/4 board 32 again, becomes a linearly polarized light beam in the direction crossing orthogonal to what it was at the time of incidence and is incident on the polarizing diffraction hologram device 31. An anisotropic optical crystal such as a lithium niobate is used for a medium to configure the polarizing diffraction hologram device 31 and a configuration that differentiates a phase difference acted by a grating to two linearly polarized light beam crossing each other orthogonally. The polarizing diffraction hologram device 31 can be utilized as a polarized beam splitter 31 that splits a linearly polarized light beam in a polarized light beam direction at the time of incidence as a $0^{th}$ order light beam and a linearly polarized light beam in the direction crossing orthogonal to the $0^{th}$ order light beam as a $\pm1^{st}$ order diffracted light beam.

Although an optical crystal is necessary, since a diffraction hologram is provided, the polarized beam splitter can be produced through an exposure development process using a photo-mask and have an advantage of mass production. Further, it is easy to miniaturize the polarized beam splitter and there is a feature in the beam splitter that its splitting ratio and an angle of splitting can be designed freely.

SUMMARY OF THE INVENTION

As a polarizing beam splitter for a magneto-optical signal detection, the conventional wollaston prism is not suitable for miniaturization and thinning. In normal polarizing diffraction, since a polarized light status of $\pm1^{st}$ order diffracted light is identical and a $0^{th}$ order light must be used for a polarized light detection, a symmetric characteristic goes worse and a noise increases.

Generally, a polarized beam splitter in FIG. 1, used in a magneto-optical head is not suitable for miniaturizing the magneto-optical head because two planes 12 and 13 are necessary for the beam splitter.

A prior art Wollaston prism 21 as shown in FIG. 2 and as described in a Japanese patent application No. 4-19522, has a problem presently concerning its own thickness for an introduction of a further miniaturization using an exposure development process by a photo-mask generally used in a semiconductor integrated circuit, because the Wollaston prism has a cubic structure. For a further miniaturization, there is another problem that if a common path optical system making common an optical path of a light beam incident on a disk and another optical path directed to an optical detector through reflection is configured by putting a semiconductor laser and the optical detector into a package, an unnecessary polarized light beam split on a projected path mixes into a signal light beam on a returning path through a reflection at a disk.

A polarized beam splitter using a grating and described in pages 622 through 628 of National Technical Report, Vol. 41, No. 6, 1995, causes a deterioration of a common mode rejection ratio and a signal to noise ratio because if the beam splitter is used for detecting a magneto-optical signal, one of two components of polarized light beam crossing each other orthogonally becomes a sum of each output of two optical detectors, another one of two components of polarized light beam becomes a signal from one optical detector, a shot noise caused by an optical detector is generated and a symmetry of a rear stage amplifier is deteriorated by a thermal noise.

Additionally, it is difficult to unify an optical detector useful for detecting a servo signal and there is a problem that a common path optical system distribution placing an optical source of a semiconductor laser on a bisector of an optical axis of a diffracted light beam is impossible to realize.

With respect to the consideration of the above subject, an object of the present invention is to provide a polarizing diffraction grating performing a polarized light beam splitting different from the conventional polarizing diffraction grating.

An object of the present invention is to differentiate a polarized light beam status of ±nth order diffracted light beam in the diffraction grating.

An object of the present invention is to acquire a magneto-optical signal from a differential output of the respective amount of an optical detection.

An object of the present invention is to use a $0^{th}$ order light beam for a servo signal detection and to place an optical source of a semiconductor laser on a central optical axis of a ±nth order diffracted light beam.

An object of the present invention is to miniaturize a magneto-optical head.

An object of the present invention is to provide a magneto-optical head having a mass production capability.

The present invention has a feature that for a natural number n, there is provided a diffraction grating wherein a polarized light beam status of +nth order diffracted light beam is different from a polarized light beam status of −nth order diffracted light beam. A polarized light beam status means a size of a particular polarized light beam. A phase difference between two components of a particular polarized light beam means the two components of a linearly polarized light beam crossing each other orthogonally.

Accordingly, the polarized light beam status becomes different when the direction of a linearly polarized light beam and the status of an oval shaped rotated polarized light beam are different respectively. Based on the above feature, it is possible to detect a magneto-optical signal by a difference between +nth order and −nth order diffracted light beam although the detection of the magneto-optical signal is impossible in the conventional polarizing diffraction grating. It is still possible to use a $0^{th}$ order light beam for detecting a servo signal and to place a laser optical source on a bisector of an optical axis of ±nth order diffracted light beam. By producing the grating through an exposure development process using a photo-mask, there are the advantages of a mass production, and miniaturizing easily and designing freely a splitting ratio or an angle of splitting.

It is preferable for the detection of a magneto-optical signal that the +nth order and the −nth order diffracted light beam are linearly polarized light beams and a polarized light beam direction of the +nth order diffracted light beam and a polarized light beam direction of the −nth order diffracted light beam cross each other orthogonally.

When an optical beam having one polarized light beam direction is a first optical beam, an optical beam having another polarized light beam direction with the two directions crossing each other orthogonally is a second optical beam and ratios of respective diffracted light beam intensity to an incident light beam intensity is the diffraction efficiency, then a diffraction efficiency of +nth order diffracted light beam of the first optical beam is different from a diffraction efficiency of −nth order diffracted light beam of the first optical beam and it is preferable for the detection of a magneto-optical signal that a diffraction efficiency of +nth order diffracted light beam of the second optical beam becomes smaller than a diffraction efficiency of −nth order diffracted light beam of the second optical beam.

Moreover, either one of the first optical beam or the second optical beam corresponds to an ordinary ray in an anisotropic medium having a different refractive index according to an incident polarized light beam direction and another one of them corresponds to an extraordinary ray.

It is preferable for the detection of a magneto-optical signal that: a diffraction efficiency of +nth order diffracted light beam of the first optical beam is identical to a diffraction efficiency of −nth order diffracted light beam of the second optical beam; and a diffraction efficiency of −nth order diffracted light beam of the first optical beam is identical to a diffraction efficiency of +nth order diffracted light beam of the second optical beam. A diffraction efficiency of ±nth order diffracted light beam of an ordinary and an extraordinary ray is symmetrical about a $0^{th}$ order light beam.

It is preferable for the detection of a magneto-optical signal that if a diffraction efficiency of −nth order diffracted light beam of the first optical beam and a diffraction efficiency of +nth order diffracted light beam of the second optical beam are 0, it is possible to perform a perfect polarized light beam splitting.

A diffraction grating of the present invention has a feature that in a different grating having more than two kinds of mediums of a different refractive index, there exists a combination of two of the mediums where a refractive index difference between the mediums becomes different dependent on an incident polarized light beam direction, in a sectional plane perpendicular to the direction along a grating pattern, the structure has a boundary line between the mediums periodic for the direction perpendicular to the grating pattern in a grating plane or periodic while enlarging or shrinking to the direction perpendicular to the direction along the grating pattern in the grating plane, and in a limited part of a period, the boundary line does not have a symmetrical plane perpendicular to both of the grating and the sectional plane.

Based on the feature, for a natural number n, it is possible to differentiate a polarized light beam status of +nth order diffracted light beam from a polarized light beam status of −nth order diffracted light beam. The aforementioned mediums include not only a solid, but also gas such as air and liquid. As an example of the air being one of the mediums, there is provided a production of a grid of a grating condition in the medium except for the air. A grating plane means a plane produced a grating pattern. A sectional plane perpendicular to the direction along a grating pattern means a flat surface having a perpendicular line of a curved line or a straight line producing a grating pattern. There is a structure such as a staircase or a saw tooth condition for an example case that a boundary line between the mediums does not have a symmetrical plane perpendicular to both of the grating and the sectional plane in a limited part of a period. In the grating plane, to be periodic while enlarging or shrinking to the direction perpendicular to the direction along the grating pattern corresponds to a periodic structure having a lens action described later.

Further, in a sectional plane perpendicular to the direction along a grating pattern, the boundary line between the mediums is periodic in the direction perpendicular to the direction along a grating pattern in a grating plane or periodic while enlarging or shrinking to the direction perpendicular to the direction along the grating pattern in the grating plane and in a limited part of a period, the boundary line bases on a layered grating pattern including a structure not having a symmetrical plane perpendicular to both of the grating and the sectional plane, a diffraction efficiency can be regulated, a diffraction efficiency of ±nth order diffracted light beam of an ordinary and an extraordinary ray can be symmetrical about a $0^{th}$ order light beam and a diffraction efficiency of a specific diffracted light beam can be set to 0.

A diffraction grating of the present invention is a diffraction grating pattern produced on a substrate by an area having a different refractive index from the substrate and a refractive index difference between the area having the different refractive index and the substrate becomes different dependent on an incident polarized light beam direction.

The area having a different refractive index is periodic for the direction perpendicular to the direction along a grating pattern in a grating plane or periodic while enlarging or shrinking to the direction perpendicular to the direction along the grating pattern in the grating plane and in a limited part of a period, a refractive index distribution of the area having the different refractive index in a sectional plane perpendicular to the direction along the grating pattern does not have a symmetrical plane perpendicular to both of the grating plane and the sectional plane.

Therefore, for a natural number n, it is possible to differentiate a polarized light beam status of +nth order diffracted light beam from a polarized light beam status of −nth order diffracted light beam. An area having a different refractive index includes for instance, an area filled with air just like in producing a grid. There is provided a staircase or saw tooth condition as an example of the sectional plane structure of the area having the different refractive index.

Moreover, although both the structure and a refractive index distribution are asymmetrical when a refractive index distribution of an area having the different refractive index is consistent, there is a refractive index distribution being non-uniform and it is necessary for the refractive index distribution to be asymmetrical even if a structure itself of an area for the above case is a symmetry.

Differentiating a refractive index difference dependent on an incident polarized light beam direction can be realized by using an anisotropic medium having a different refractive index based upon the incident polarized light beam direction for at least either one of a substrate or an area having a different refractive index. One not using the anisotropic medium may use an isotropic medium having a same refractive index according to an incident polarized light beam direction.

Further, a second grating pattern prepared on or below a grating plane of a grating pattern produced according to an area having the different refractive index is utilized, the second grating pattern is periodic for the direction perpendicular to the direction along a grating pattern in a grating plane or periodic while enlarging or shrinking to the direction perpendicular to the direction along the grating pattern in the grating plane and in a limited part of a period, the diffraction efficiency can be regulated, a diffraction efficiency of ±nth order diffracted light beam of both an ordinary and extraordinary rays can be symmetrical by a boundary of $0^{th}$ order light beam and a diffraction efficiency of a specific diffracted light beam can be set to 0 by a sectional refractive index distribution perpendicular to the direction along the grating pattern not having a symmetrical plane perpendicular to both of the grating and sectional plane.

There is provided a staircase or a saw tooth condition as an example of a sectional plane structure of the second grating pattern. A refractive index distribution may be non-uniform. Aforementioned grating pattern of the diffraction grating is not limited to a linear condition, but may be a curved line condition. A lens action can be held to a diffracted light beam. Based upon this action, a detection of focus shifting can be possible according to a beam size method.

It is not necessary to use a prism compared with the prior art and is possible to miniaturize an optical head by using a magneto-optical head featuring that aforementioned diffraction grating, pluralities of optical detectors detecting +nth order and −nth order diffracted light beam of the diffraction grating are provided and a reflection light beam from a magneto-optical recording medium is incident on the diffraction grating.

It is still possible to place the pluralities of optical detectors on the identical side for a grating plane of the diffraction grating. If a polarized light prism 11 of the prior art is used, although miniaturization can not be done in the width direction because one polarized light beam is emitted to the direction perpendicular to an incident light beam when polarizing a light beam and splitting it, it is possible to miniaturize by using a diffraction grating of the present invention and possible to place the pluralities of optical detectors on an identical plane.

A diffraction grating of the present invention introducing a lens action is used, making a focus to a position where a distance from a grating plane to the +nth order and −nth order diffracted light beam is different from each other at the same time the diffraction grating has a grating pattern in which a center of its curvature is a row of an identical circle arc or a concentric circle.

The pluralities of optical detectors are placed on a position separated from the grating plane by an average distance of a distance to the focusing point of the +nth order and −nth order diffracted light beam.

A common path optical system distribution can be done by preparing a laser optical source placed on a bisector of an optical axis of the +nth order diffracted light beam and the −nth order diffracted light beam and on a position having an optical axis other than the center of its curvature or a center of the concentric circle.

Accordingly, a splitter (e.g., a beam splitter) is not necessary, in addition to the reduction of parts, miniaturization is available because of placing on a straight line. It is possible to place the pluralities of optical detectors and the laser optical source on an identical plane.

It is still possible to unify a diffraction grating and a condensing grating through an exposure development process using a photo-mask and unify at least one of the optical detectors, the laser optical source and the diffraction grating. According to the unification, a super miniaturized magneto-optical head is available to be produced and utilized. There is an advantage for a mass production capability since a huge amount of an optical axis adjustment can be performed all at once.

It is further possible to detect a focusing signal or a tracking error signal from a 0th order light beam by preparing a grating pattern of a diffraction grating for a linear condition and preparing an optical detector detecting a 0th order light beam of the diffraction grating.

BRIEF DESCRIPTION OF THE DRAWINGS

The embodiments of the present invention are described below in conjunction with the figures, in which.

DESCRIPTION OF THE PREFERRED EMBODIMENT

A description will be given of the present invention by reference to the accompanying drawings.

Figure 1:
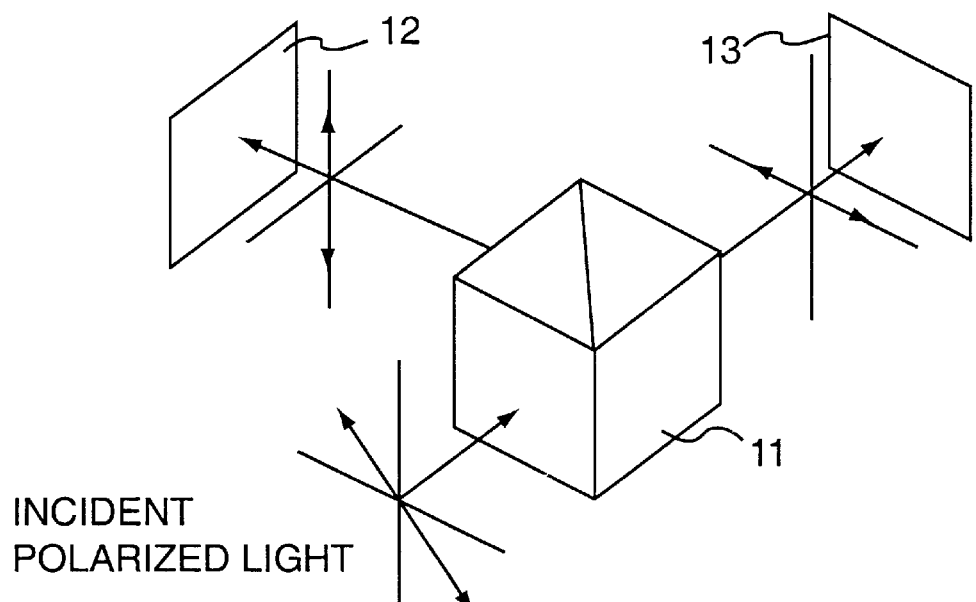
FIG. 1 is a prior art example of a polarized light beam splitting based upon a polarized light prism.
Figure 2:
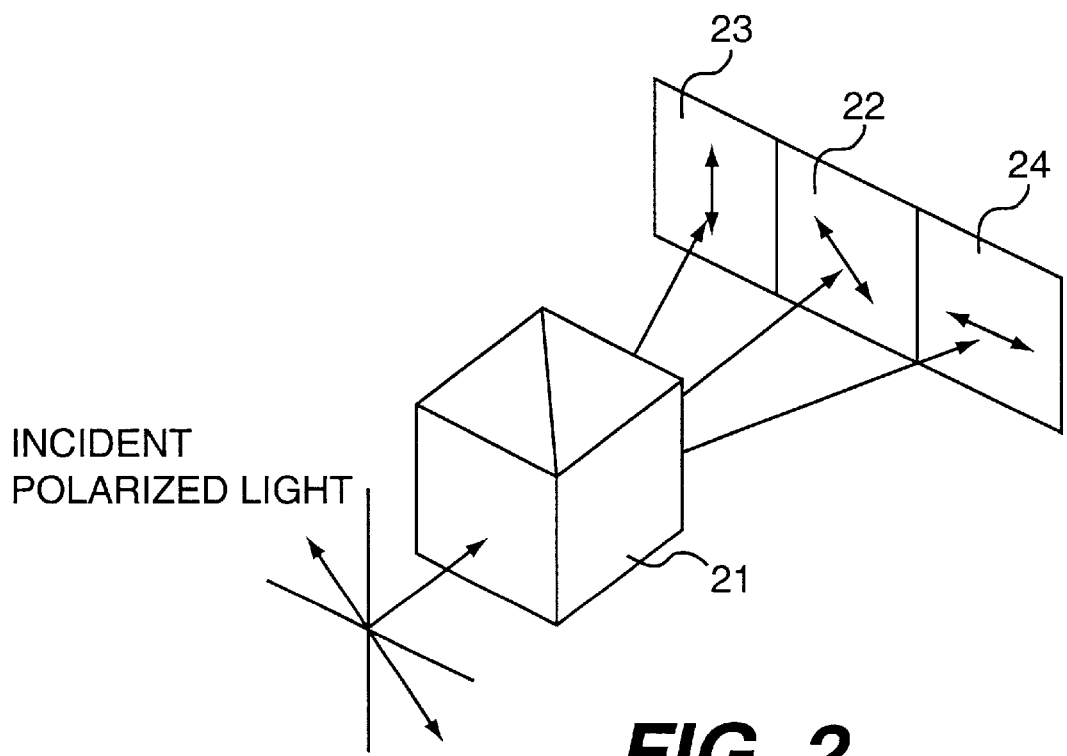
FIG. 2 is a prior art example of a polarized light beam splitting based upon a Wollaston prism.
Figure 3:
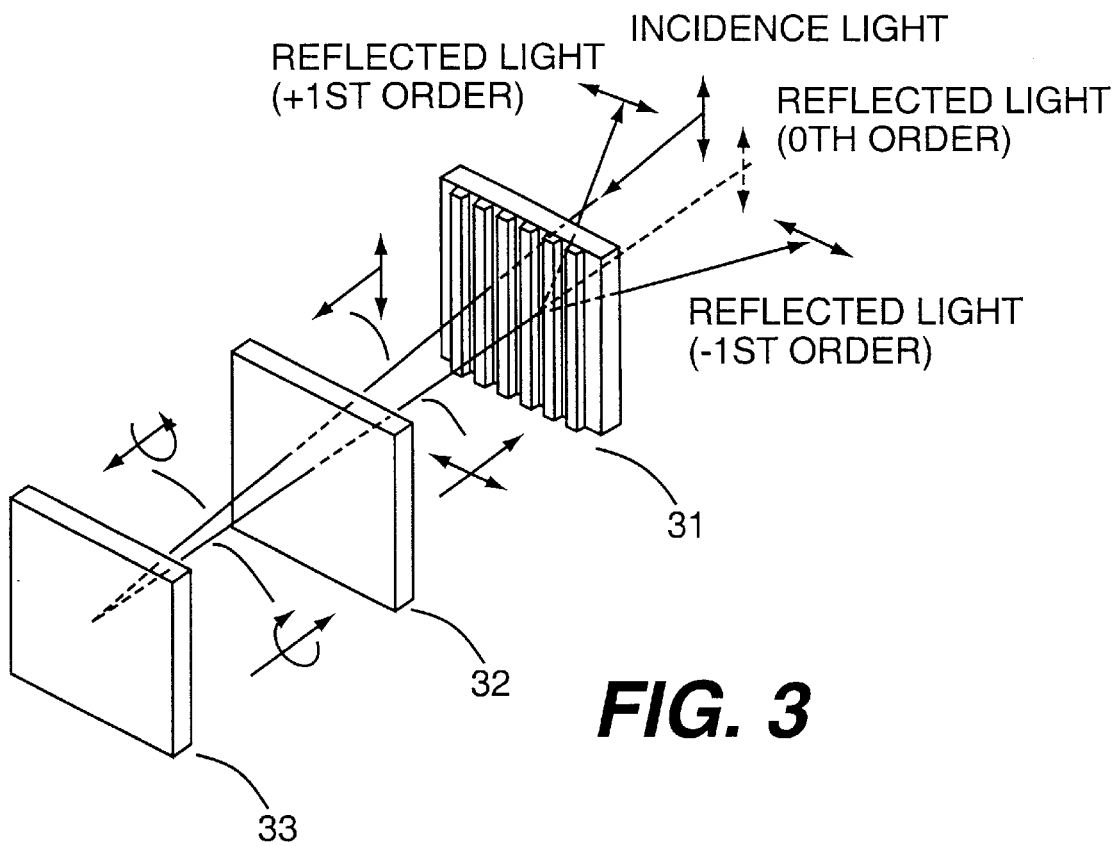
FIG. 3 is a prior art example of a polarizing diffraction grating.
Figure 4:
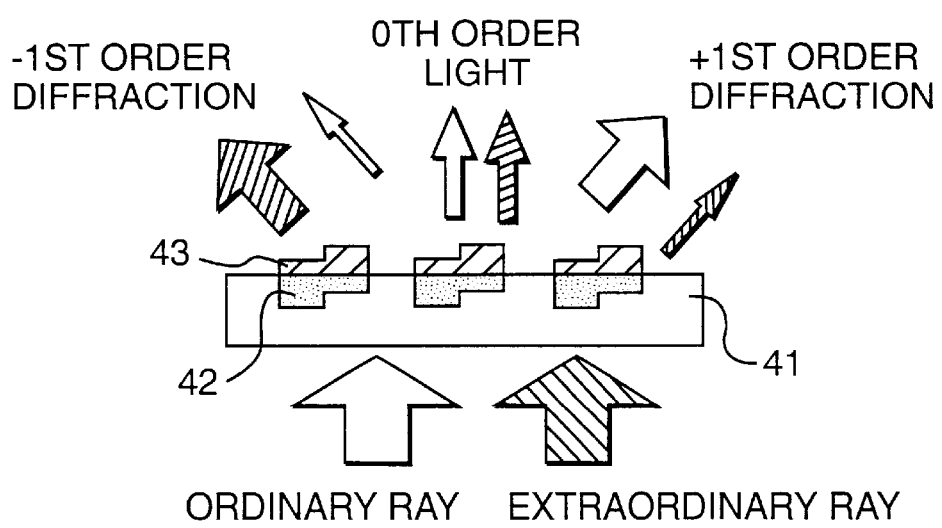
FIG. 4 is a conceptual sectional diagram of a polarizing diffraction grating based upon the present invention.

FIG. 4 shows a basic conceptual sectional diagram of a polarizing diffraction grating based upon the present invention. An ion exchange area 42 is produced by an ion exchange based upon an acid after producing an appropriate mask on an anisotropic crystal substrate 41, such as lithium niobate that is an anisotropic medium. This process is called a proton exchange. Moreover, a producing method of an ion exchange area based upon the proton exchange is described in pages 167 through 170 of "an optical integrated circuit" authored by Hiroshi Nishiwara, Ohm company, first edition 1989. A method of producing a grating pattern based upon the proton exchange is described in page 208 of the above technical journal.

According to these methods, when heating a benzoic acid (C6H6COOH) at the temperature between a melting point 121° C. and a boiling point 250° C. to become a liquid and dipping a lithium niobate into the liquid, an exchange of a lithium ion and a hydrogen ion happens and a high refractive index layer is produced on a crystal surface. A mask is produced by Cr and Ti on an area for preventing a proton exchange to produce a grating. If the Ti is used, after spattering the Ti on a lithium niobate crystal, a mask can be produced by performing a grating patterning with a photo-register and perforating a Ti layer by etching. Thereafter, a proton exchange is performed, the Ti layer is removed and a grating is produced by annealing.

An anisotopic crystal is a crystal having a different refractive index dependent upon an incident polarized light beam direction. In a general crystal having an axis, a constant ordinary refractive index regardless of an optical advancing direction and an extraordinary refractive index varying by the optical advancing direction, components of a linearly polarized light beam acted by the respective refractive indexes are called an ordinary ray and an extraordinary ray.

A refractive index staircase variation can be realized by using a mask having a different width of aperture during an ion exchange and an amount of this refractive index variation provides the difference between an ordinary and an extraordinary refractive index. A grating pattern 43 using an isotropic medium is produced for two stages after an ion exchange.

An example of an isotropic and an anisotropic medium is described below.

An example of an isotropic medium used for a thin layer production is described in page 175 of "an optical engineering handbook" authored by Terutsugu Ose, first edition 1986. For instance, several mediums such as SiO2, LiF, ZnS and MgO can be used with respect to a refractive index.

As for an anisotropic medium, according to pages 139 through 142 of "an optical integrated circuit" authored by Hiroshi Nishiwara, Ohm company, 1985, for instance, a lithium niobate (ne=2.2, no=2.286), Titanium oxide (ne=2.865, no=2.583), Wulfenite (or lead molybdate) (ne=2.262, no=2.386), Lithium tantalate (ne=2.176, no=2.180), Barium titanate (ne=2.41, no=2.36) and Zinc oxide (ne=1.999, no=2.015) are introduced.

In an optical beam incident on a polarizing diffraction grating thus produced: ±1st order diffracted light beam is large, 0th order light beam and −1st order diffracted light beam are small regarding an ordinary ray acted upon by an ordinary refractive index; and on the other hand, −1st order diffracted light beam is large, 0th order light beam and +1st order diffracted light beam are small regarding an extraordinary ray acted upon by an extraordinary refractive index.

Accordingly, when receiving ±1st order diffracted light beam independently, it is possible to split the respective ordinary and extraordinary rays mostly from an incident light beam having a mixture of both rays.

Figure 5:
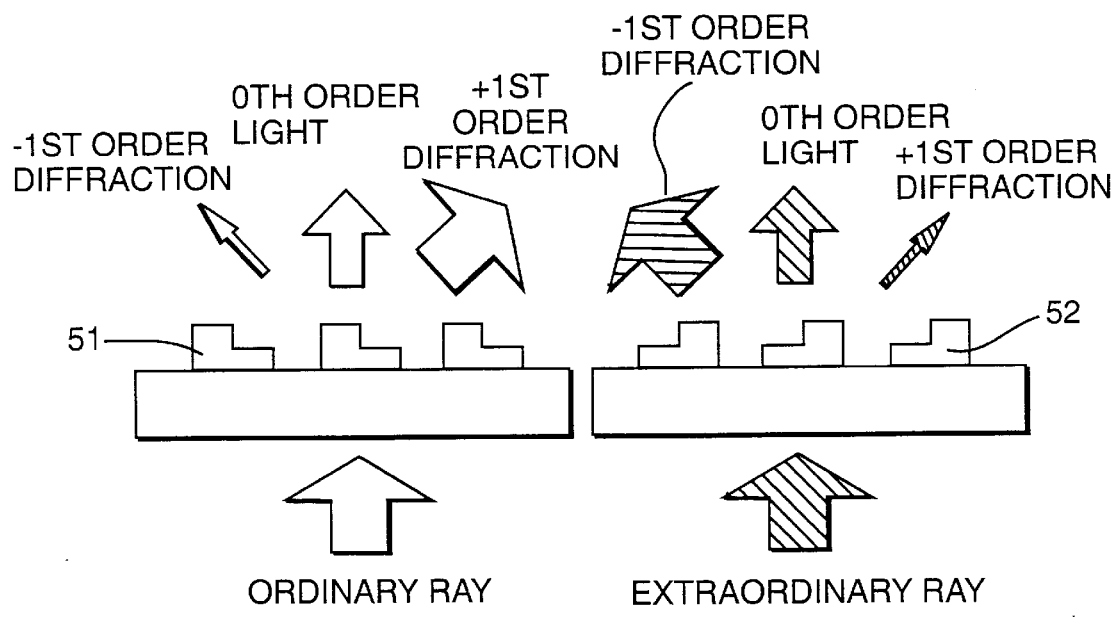
FIG. 5 is a sectional diagram describing a symmetrical characteristic of a diffraction efficiency in an ordinary and extraordinary ray.

FIG. 5 describes a principle that a diffraction efficiency of ±1st order diffracted light beam becomes unbalanced symmetrically in an ordinary and extraordinary ray. FIG. 5 shows the respective ordinary and extraordinary rays individually, and further shows phase difference patterns 51 and 52 acting on the respective rays.

The phase difference patterns 51 and 52 acting on the respective rays have symmetrical structure, and unbalance of diffraction efficiency of ±1st order diffracted light beam can be reversed with respect to ordinary and extraordinary rays.

There is a description provided to give symmetrical phase distribution on both sides in ordinary and extraordinary rays by using an anisotropic crystal.

Figure 6:
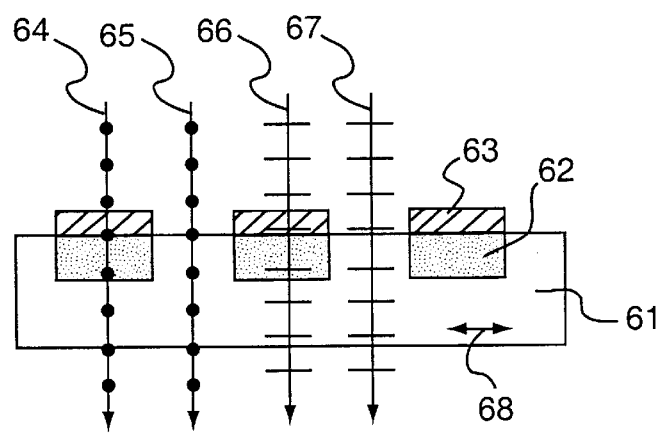
FIG. 6 is a sectional diagram describing a principle of a polarizing diffraction grating.

FIG. 6 shows a diagram describing a principle of a polarizing diffraction grating. An example using a lithium niobate (LiNbO3) is shown in FIG. 6. A lithium niobate substrate 61 has a principal optical axis 68 in an inner plane direction, a proton exchange area 62 on the principal optical axis 68 with respect to a grating pattern and a grating pattern 63 using an isotropic medium. A phase difference φo between the grating pattern and incident ordinary rays 64 and 65 and a phase difference φe between extraordinary rays 66 and 67 are expressed respectively by the following equations.

$$\phi o = (2\pi/\lambda)\{(nd-1)Td + \Delta no Tp\}$$

$$\phi e = (2\pi/\lambda)\{(nd-1)Td + \Delta ne Tp\} \quad (1)$$

λ: Wave length.

nd: Refractive index of grating pattern using an isotropic medium.

Td: Thickness of grating pattern using an isotropic medium.

Δno: Refractive index variation (−0.04) of an ordinary ray according to a proton exchange.

Δne: Refractive index variation (0.12) of an extraordinary ray according to a proton exchange.

Tp: Depth of a proton exchange area.

When the respective phase difference are set to an arbitrary design value by considering a diffraction efficiency and a simultaneous first order equation is solved by setting the thickness of a grating pattern using an isotropic medium Td and the depth of a proton exchange area Tp as unknown values, Tp and Td are given as equation (2).

$$Tp = (\lambda/2\pi)((\phi o - \phi e)/(\Delta no - \Delta ne))$$

$$Td = (\lambda/2\pi)((\Delta no \phi e - \Delta ne \phi o)/(nd-1)(\Delta no - \Delta ne)) \quad (2)$$

Figure 7:
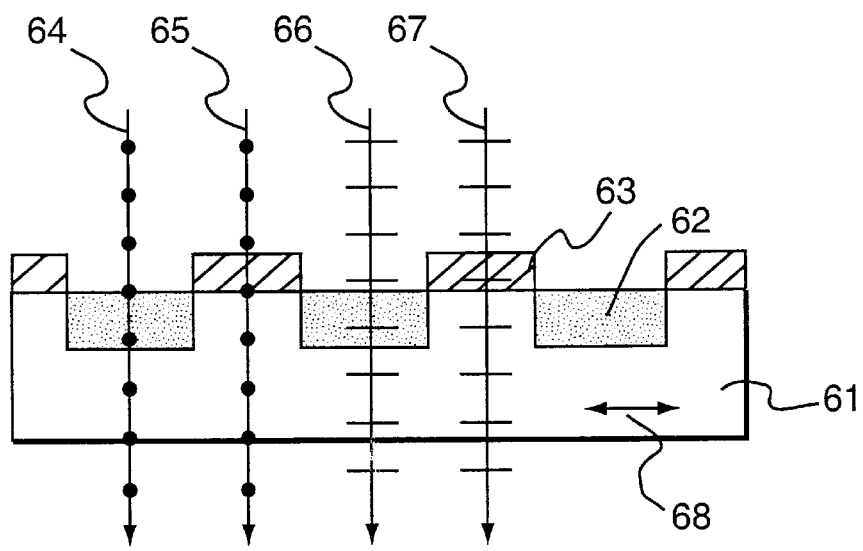
FIG. 7 is a sectional diagram showing a polarized diffraction grating in which thickness of a grating pattern of an isotropic medium is negative.

A polarized light beam grating giving a desired phase difference independently in ordinary and extraordinary rays can be designed. For instance, if a wavelength is set as λ=0.41 μm, CeO2 is used for a grating pattern employing an isotropic medium, a refractive index is set as nd=2.2 and the phase difference φo, φe are set respectively as φo=−90° and φe=+90°, and Tp and Td may be set as Tp=1.28 μm and Td=−0.043 μm. If Td is negative, a grating pattern using an isotropic medium may be produced on a place not performing a proton exchange in FIG. 7, being different from FIG. 6. A phase difference of a staircase condition shown in FIG. 5 can be realized equivalently because a phase difference of an equal absolute value in ordinary and extraordinary rays can be given by reversing a sign.

There is provided a description of a phase grating in which a diffraction efficiency of ±1st order diffracted light beam becomes unbalanced. In general, an amplitude transmissivity of a diffraction grating of a period Λ is given as the following Fourier series, according to its periodic characteristics.

$$t(x) = \Sigma Ak \cdot \exp\{2\pi kx/\Lambda\}, \text{ where } \Sigma \text{ means summation when } k=-\infty \text{ to } \infty \quad (3)$$

x: Position coordinate of a grating direction of a diffraction grating.

t(x): Amplitude transmissivity at x.

Ak: Complex amplitude of kth order diffracted light beam where a total optical intensity is 1.

Λ: A grating pitch of a diffraction grating.

Ak is introduced as an equation (4) given below.

$$An = (1/\Lambda)\int t(x)\exp\{-2\pi nx/\Lambda\}dx, \text{ where } \int \text{ means summation when } x=0 \text{ to } \Lambda \quad (4)$$

Figure 8:
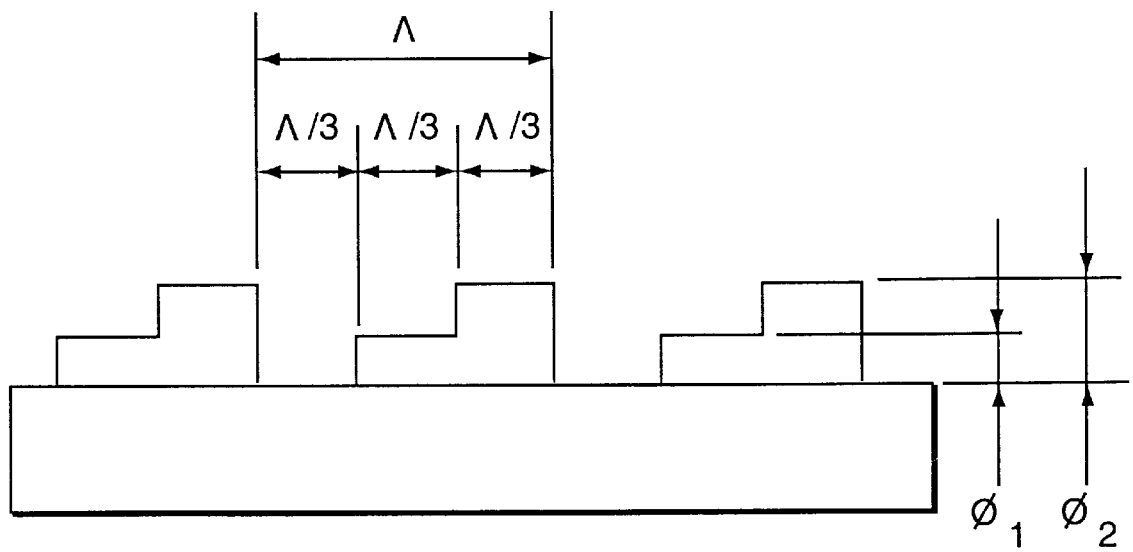
FIG. 8 is an example sectional diagram showing three stage phase fraction grating.

If a diffraction efficiency of a phase grating having three staged phase stage difference of an equal width as shown in FIG. 8 is calculated by using the equation (4), when φ1=70° and φ2=140°, a diffraction efficiency can be acquired wherein −2nd order diffracted light beam is 9.9%, −1st order diffracted light beam is 7.1%, 0th order light beam is 31.5%, +1st order diffracted light beam is 39.7%, +2nd order diffracted light beam is 1.8%.

Figure 9:
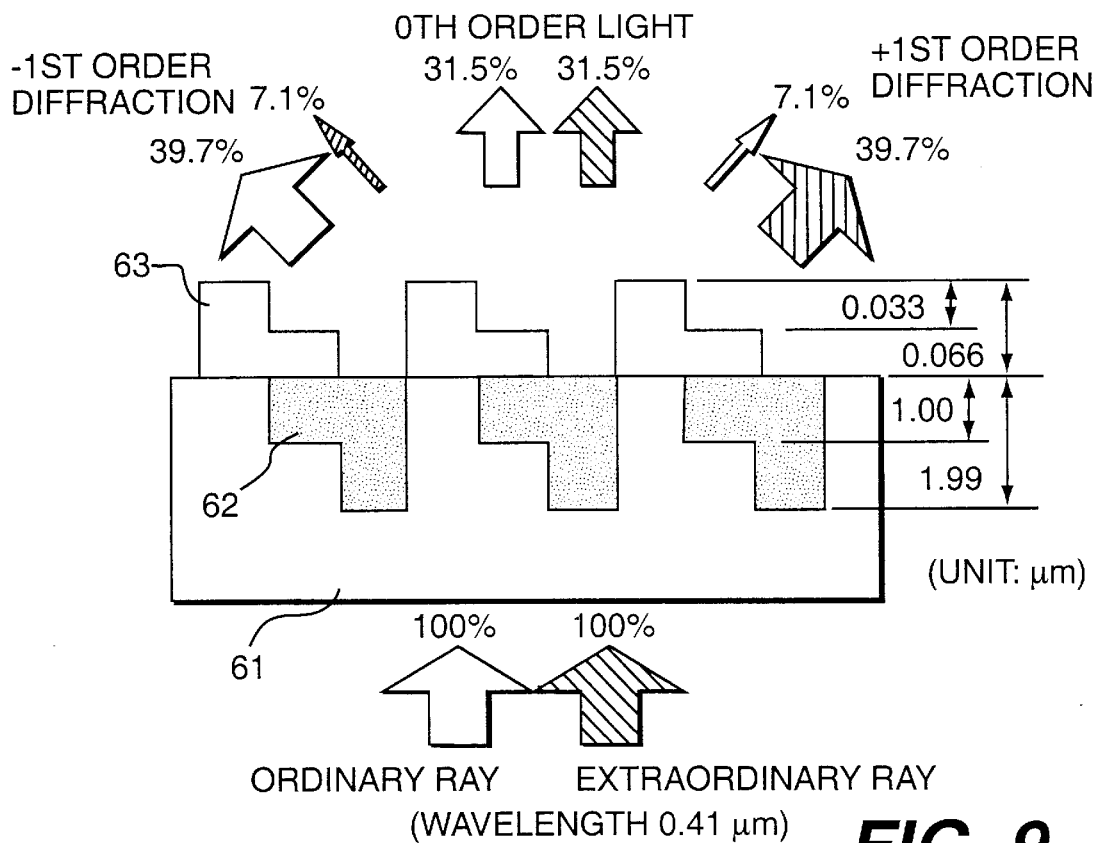
FIG. 9 is a sectional diagram showing a first embodiment of a polarizing diffraction grating based upon the present invention.

Accordingly, for realizing the diffraction efficiency of above values by using a polarizing diffraction grating, where φ1 at an ordinary ray is set as φo1, φ1 at an extraordinary ray is set as φe1, φ2 at an ordinary ray is set as φo2 and φ2 at an extraordinary ray is set as φe2, then φo1=−70°, φo2=−140°, φe1=+70° and φe2=+140° may be set. That is, Tp1=1.00 μm, Td1=−0.033 μm, Tp2=1.99 μm and Td2=−0.066 μm are set. Thus, a diffraction grating shown in FIG. 9 is provided. It is understood that diffraction efficiencies of an ordinary and extraordinary ray are different symmetrically in ±1st order diffracted light beam and a polarized light beam splitting can be realized.

Figure 10:
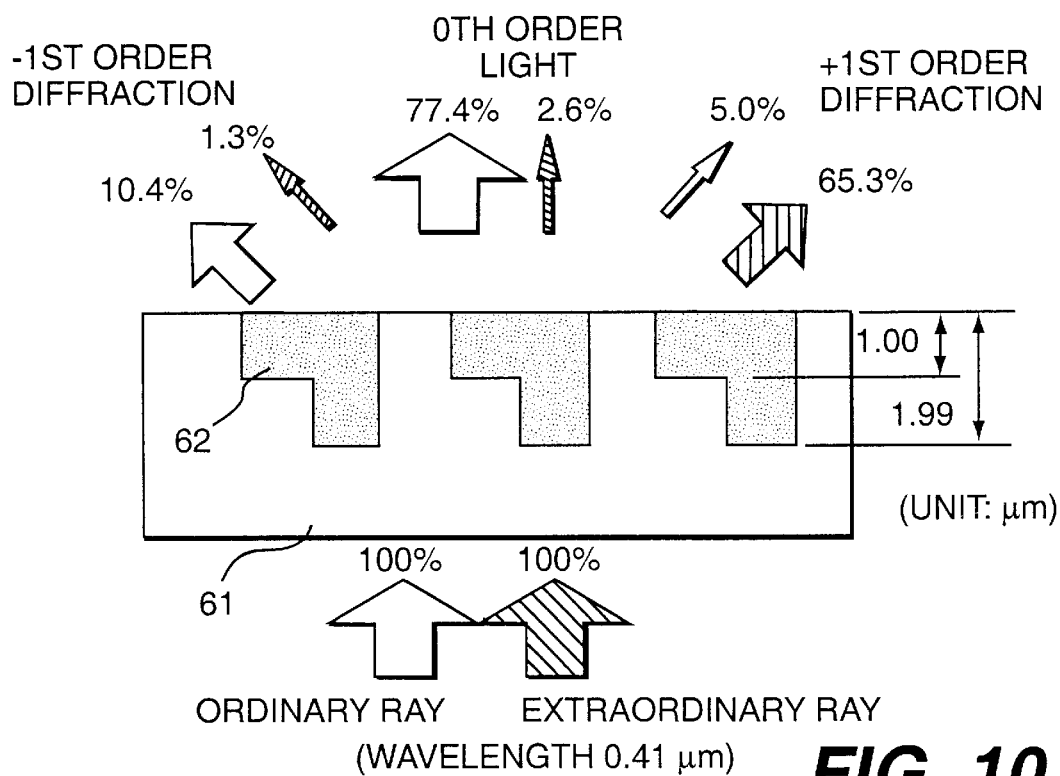
FIG. 10 is a sectional diagram removing a grating pattern using an isotropic medium in the first embodiment of the polarizing diffraction grating based upon the present invention.

For verifying an effect of a grating pattern using an isotropic medium, where a grating pattern 63 using an isotropic medium in FIG. 9 is not provided, a calculation result is shown in FIG. 10. Even if a grating pattern using an isotropic medium is not provided, it is possible to differentiate a polarizing light beam status of ±1st order diffracted light beam.

It is preferred to prepare a grating pattern 63 using an isotropic medium because a symmetry can be held for an ordinary and an extraordinary ray by preparing the grating pattern using the isotropic medium.

Figure 11:
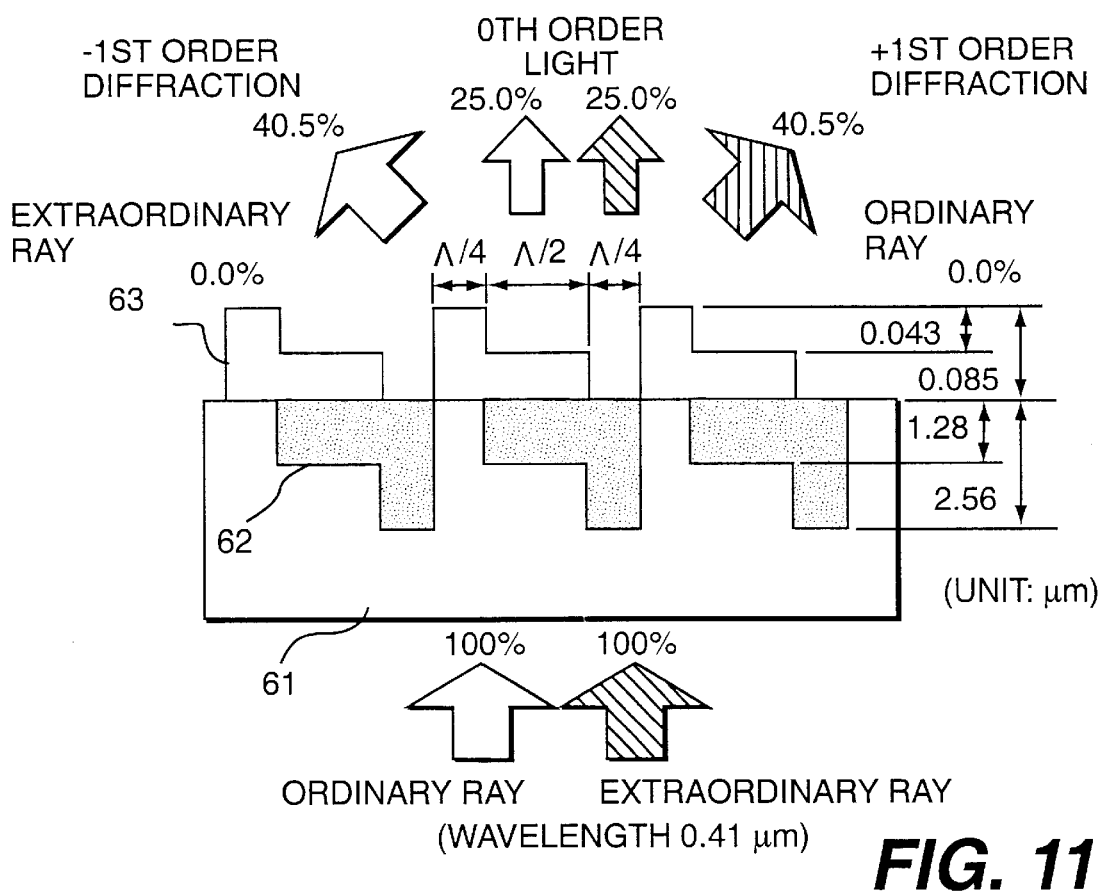
FIG. 11 is a sectional diagram showing a second embodiment of a polarizing diffraction grating based upon the present invention.

FIG. 11 shows an example of another embodiment. Although a stage difference of a phase variation is a three stage, a width of respective stages is varied. In this embodiment, ±1st order diffracted light beam is completely split by polarizing a light beam because a diffraction efficiency of a 1$^{st}$ order diffracted light beam of an ordinary ray and a diffraction efficiency of an extraordinary ray are 0.

In these embodiments, although a description is given for having a phase difference of a staircase condition of a three stage, if a limitation given is removed, it is possible to design ideally a polarizing diffraction grating of an arbitrary diffraction efficiency and having a sufficiently large extinction ratio. For instance, it is possible to apply a phase distribution of a saw tooth condition shown in FIG. 12 as an extreme limitation by further increasing the number of stages.

Figure 12:
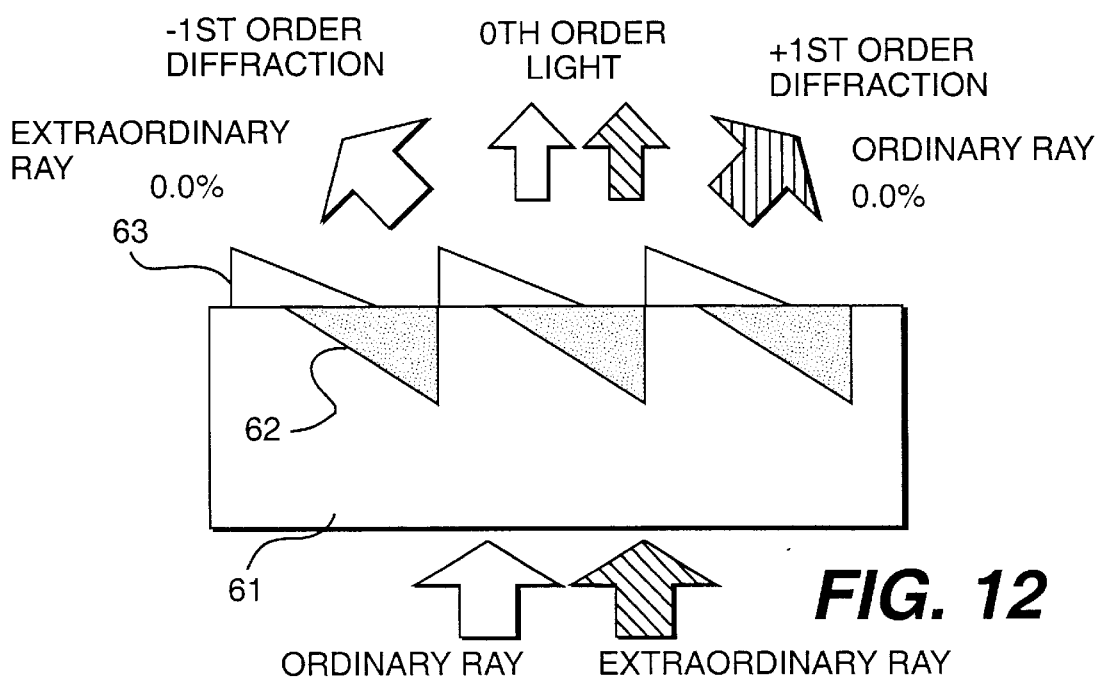
FIG. 12 is a sectional diagram showing an embodiment of saw tooth conditioned polarizing diffraction grating.
Figure 21:
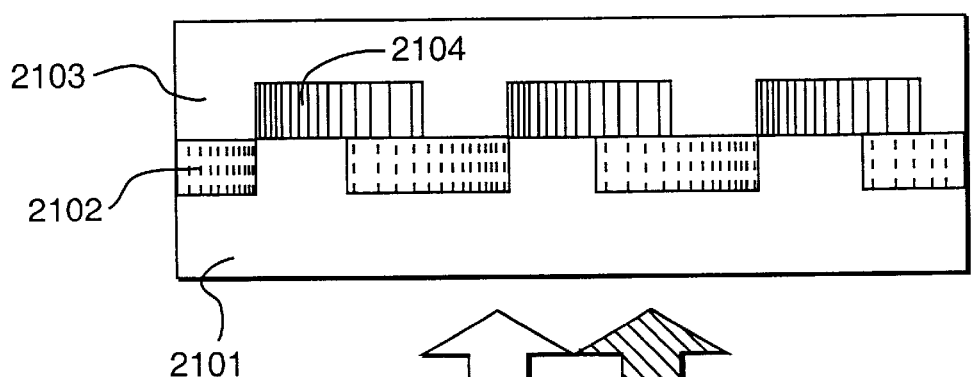
FIG. 21 is a diagram showing other embodiments giving the same phase difference as a diffraction grating of a saw tooth condition.

FIG. 21 shows other embodiments giving the same phase difference as a diffraction grating of a saw tooth condition as shown in FIG. 12. A diffraction grating is provided by producing graduated refractive index areas 2102 and 2104 of a grating medium in a grating plane direction on substrates 2101 and 2103. At least one of mediums 2101, 2102, 2103 and 2104 producing these gratings is produced by an anisotropic medium. If either one of a phase difference occurred by a grating medium 2102 or a phase difference occurred by a grating medium 2104 can be differentiated by an ordinary and an extraordinary ray, it is possible to let these mediums act as a diffraction grating of the present invention.

Accordingly, a polarizing split diffracted light beam can be obtained by giving the same phase difference as in FIG. 12 to an incident ordinary and extraordinary ray. For producing an aforementioned grating, it is suitable to perform an ion implantation to the substrates 2101 and 2103 by using an ion beam and after producing respective gratings, the respective gratings may be put together.

It is possible to realize a gradually varying refractive index variation by letting a scanning speed of an ion beam slow in an area of a high refractive index and fast in an area of a low refractive index.

Although there is no description of the structure whether a grating is linear or not, it is needless to say that an arbitrary design and production is available as well as a normal isotropic diffraction grating. Moreover, it is possible to have a lens action if a grating is a curved line.

In aforementioned embodiments, although an assumption of a proton exchanged polarizing diffraction grating for a lithium niobate crystal is given, it is needless to say that other optical crystals, an organic medium, a liquid crystal medium, etc may be acceptable as a medium having a different amount of a refractive index variation dependent on the polarized light beam direction in an anisotropic medium.

In aforementioned description, an example for performing a proton exchange by using an anisotropic medium as a substrate as shown in FIG. 10 and an example for producing a grating of an isotropic medium on the substrate as shown in FIG. 9 are given, a configuration of a medium for realizing a diffraction grating differentiating a polarized light beam status of ±nth order diffracted light beam is not limited to these examples.

Figure 20:
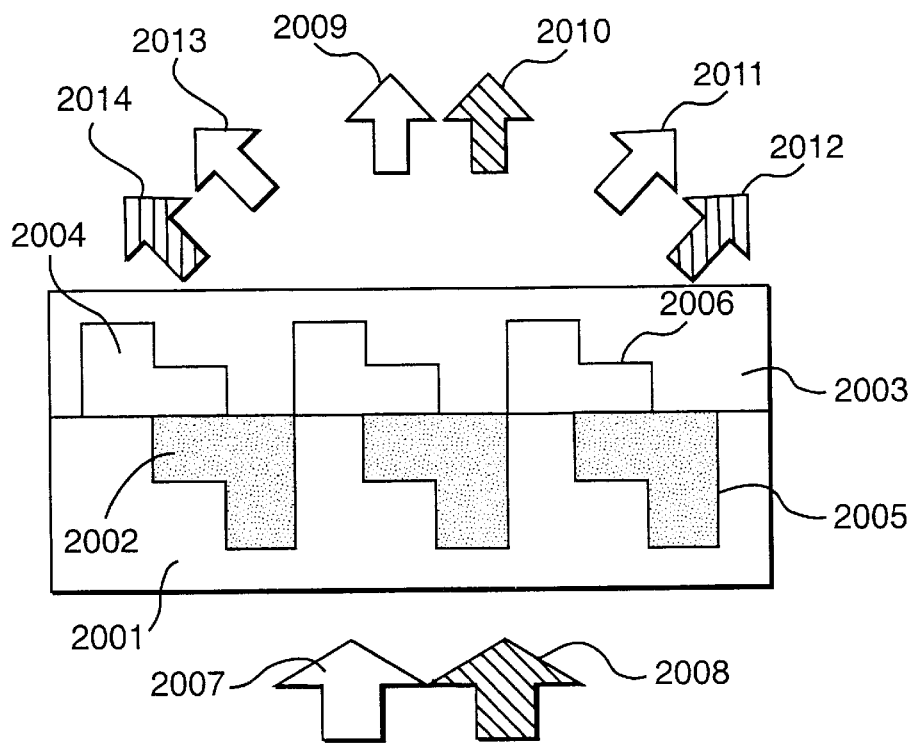
FIG. 20 is a sectional diagram describing a configuration of a polarizing diffraction grating based upon the present invention.

FIG. 20 shows a diagram describing a configuration of a polarizing diffraction grating based upon the present invention. A medium A 2001, a medium B 2002, a medium C 2003, a medium D 2004, a boundary line 2005 between the mediums A and B, a boundary line 2006 between the mediums C and D, an ordinary ray 2007, an extraordinary ray 2008, $0^{th}$ order light beam of an ordinary ray 2009, $0^{th}$ order light beam of an extraordinary ray 2010, +nth order diffracted light beam of an ordinary ray 2011, +nth order diffracted light beam of an extraordinary ray 2012, −nth order diffracted light beam of an ordinary ray 2013, −nth order diffracted light beam of an extraordinary ray 2014 are provided in FIG. 20.

For realizing a diffraction grating differentiating a polarized light beam status of ±nth order diffracted light beam, in a diffraction grating having more than two kinds of mediums (the medium A 2001, the medium B 2002, the medium C 2003, the medium D 2004, etc) having a different refractive index, in a combination of two mediums (e.g., the medium A 2001 and the medium B 2002) in the above mediums, there exists a combination having a different refractive index difference between mediums dependent on an incident polarized light beam direction (it may be acceptable to have a different refractive index difference in an ordinary and an extraordinary ray), a boundary line 2005 between the mediums in a sectional plane (sectional plane shown in FIG. 20) perpendicular to the direction along a grating pattern is periodic for the direction (right and left direction in FIG. 20) perpendicular to the direction along a grating pattern in a grating plane or periodic while enlarging or shrinking to the direction perpendicular to the direction along the grating pattern in the grating plane and in a limited part of a period, it is acceptable that the boundary line does not have a symmetrical plane perpendicular to both sides of a plane perpendicular to both of the grating plane and the sectional plane. Aforementioned medium includes air.

FIG. 10 shows an example configuring only the medium A 2001 and the medium B 2002, in contrast with the configuration of the polarizing diffraction grating employing the medium A 2001, the medium B 2002, the medium C 2003, the medium D 2004, the boundary line 2005 between the medium A 2001 and the medium B 2002, the boundary line 2006 between the medium C 2003 and the medium D 2004 as in FIG. 20 and both mediums are anisotropic medium. Either one of the mediums may be replaced by an isotropic medium. For instance, it may be acceptable that the medium A 2001 is an anisotropic medium and the medium B 2002 is an isotropic medium such as an air.

In FIG. 9, if the mediums shown in the configuration of the polarizing diffraction grating as in FIG. 20 are applied for describing the respective mediums shown in FIG. 9 the medium A 2001 and the medium B 2002 are anisotropic mediums, the medium C 2003 is an air and the medium D 2004 is an isotropic medium. A boundary line 2005 satisfies the requirement of asymmetry. If the medium A 2001 and the medium B 2002 are the same medium, that is, the boundary line 2005 does not exist, the medium C 2003 is an anisotropic medium and the medium D is an isotropic medium such as an air, then it is possible to differentiate a polarized light beam status of ±nth order diffracted light beam because there are mediums A, C, D and a boundary line 2006 satisfies the requirement of a refractive index difference and asymmetry. If the requirement of the refractive index difference is satisfied, it may be acceptable to replace the air of the medium D 2004 with a medium except for the medium C 2003.

Regarding an adjustment of a diffraction efficiency, a boundary line between the mediums in a sectional plane perpendicular to the direction along a grating pattern is periodic for the direction perpendicular to the direction along a grating pattern in a grating plane or periodic while enlarging or shrinking to the direction perpendicular to the direction along the grating pattern in the grating plane and in a limited part of a period, the above boundary line is available to produce by layering a grating pattern including a structure not having a symmetrical plane perpendicular to both of the grating plane and the sectional plane.

In FIG. 9, a boundary line 2006 between an isotropic medium 63 corresponding to the medium D 2004 and an air corresponding to the medium C 2003 corresponds to another combination.

For a combination except for aforementioned mediums, if the above requirement is satisfied, it is possible to differentiate a polarized light beam status of ±nth order diffracted light beam and to regulate a diffraction efficiency.

Although the description of a consistent refractive index distribution of the medium is given by the aforementioned, it is acceptable for a non-uniform refractive index distribution shown in FIG. 21 and therefore, there may not be a boundary line but be an asymmetrical refractive index distribution.

An embodiment of a magneto-optical head using a polarizing diffraction grating of the present invention is described below.

Figure 13:
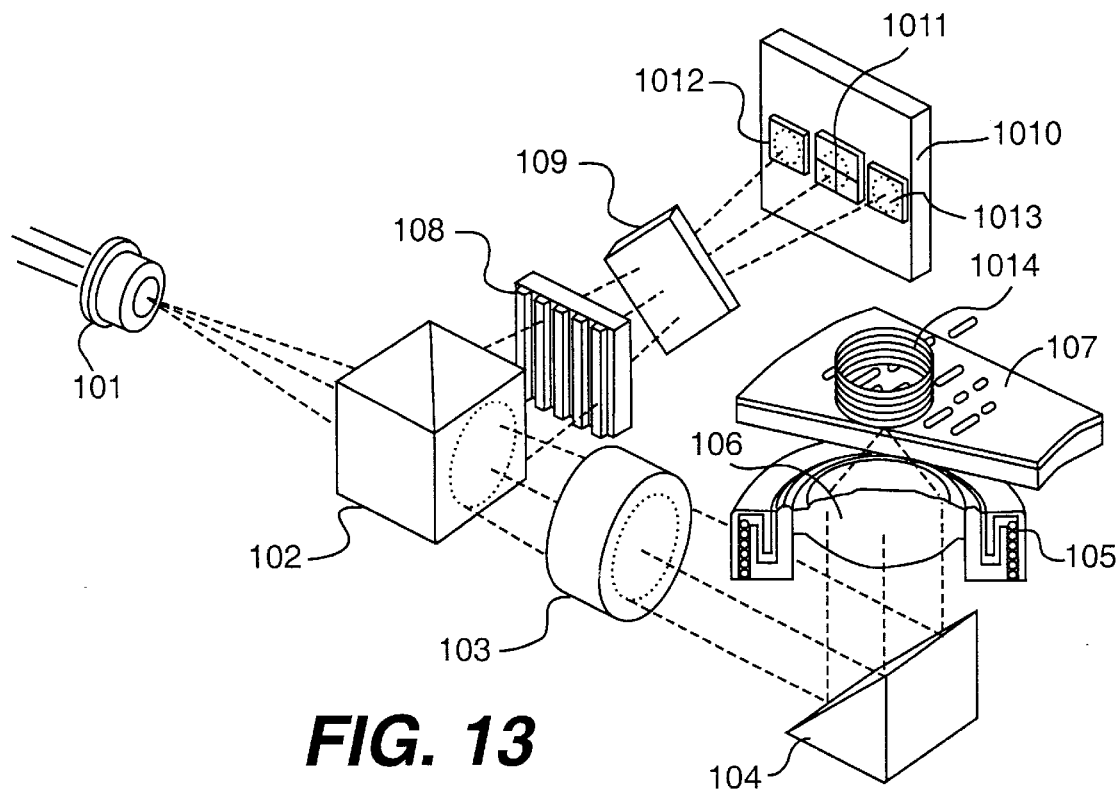
FIG. 13 is a diagram showing an embodiment of a magneto-optical head based upon the present invention.

FIG. 13 shows an embodiment of the magneto-optical head using the polarizing diffraction grating of the present invention. A linearly polarized light beam from a semiconductor laser 101 transmits through a beam splitter 102, is made parallel at a collimation lens 103, is reflected at a 45° reflector 104 and is condensed into a magneto-optical recording medium 107 through an object lens 106 built in a lens actuator 105. Depending on a presence of a magneto-optical domain, a polarized light beam direction rotates in the reversed direction and a recording information is transferred.

A reflected light beam is reflected at a beam splitter through the object lens 106, the 45° reflector 104 and the collimation lens 103 and incident on the polarizing diffraction grating 108 of the present invention. The respective part of a linearly polarized light beam component of the direction making +45° and −45° to an incident linearly polarized light beam direction is diffracted as +1$^{st}$ order diffracted light beam and −1$^{st}$ order diffracted light beam. Further, a rest of the light beam transmits through a polarizing diffraction grating 108 as a 0$^{th}$ order light beam.

Thereafter, an astigmatism is given by a cylindrical lens 109 for detecting an astigmatism focusing shift and the light beam is condensed into an optical detector 1010. The optical detector 1010 is divided into a central four quadrant detection area 1011 and diffracted light beam detection areas 1012, 1013, and detects a 0$^{th}$ order light beam at the center and ±1st order diffracted light beam at the diffracted light beam detection areas 1012, 1013.

When recording an information into a magneto-optical recording medium 107, after magnetizing in advance a magneto-optical recording medium consistently in a direction and adding a magnetic field reverse to an initial magnetized direction by an electrical magnetic coil 1014, a recording domain is produced by using a semiconductor laser light beam intensely modulated by a recording information and raising locally the temperature to a curie temperature of a recording layer.

While irradiating with a condensed spot of a constant intensity so that the temperature of a medium becomes beyond the curie point temperature, it is no trouble to employ a magnetic field modulation recording for modulating and recording a magnetized direction made through the electrical magnetic coil by using a recording information. Further, a method for pulse-modulating and recording an optical or a magnetic field may be acceptable.

Figure 14:
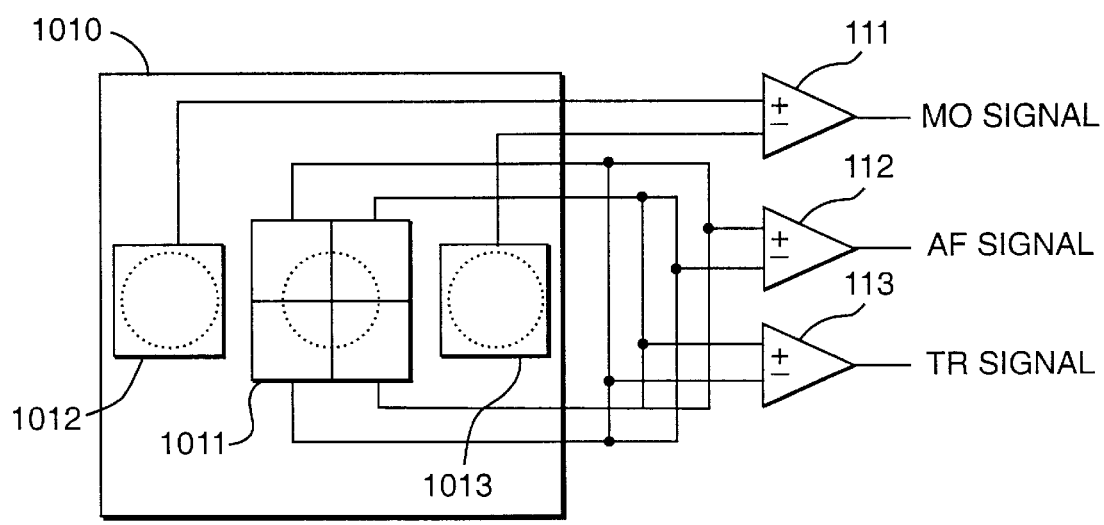
FIG. 14 is a circuit diagram describing a signal detection method of a magneto-optical head based upon the present invention.

FIG. 14 shows a circuit diagram describing a signal detection method from an optical detector 1010. A focusing error signal and a tracking error signal are detected from a central four quadrant optical detection area 1011. A focusing error signal is acquired by using a differential amplifier 112 for detecting a differential signal of a sum of a signal output from opposite angled area in the four quadrant detection area. A closed loop control is performed by feeding back the detected signal to a lens actuator 105 in FIG. 13. The tracking error signal can be obtained by detecting the differential signal of a sum for two areas on the both sides of the four quadrant optical detector through a differential amplifier 113. This is called a push-pull method for detecting unbalance of a diffraction pattern by a guidance grid on a magneto-optical recording medium. A closed loop control is performed by feeding back the tracking error signal to the lens actuator 105 in FIG. 13. The lens actuator in FIG. 13 is a two dimensional actuator having a driving axis in two directions of an optical axis direction and a disk radius direction.

A ±1$^{st}$ order diffracted light beam having a polarized light beam component crossing each other orthogonally by a polarizing diffraction grating 108 based on the present invention is detected by two optical receiving areas 1012 and 1013 placed on the both sides of the four quadrant optical detection area 1011 and a magneto-optical signal can be obtained by detecting a differential signal of this detected output through a differential amplifier 111.

Figure 15:
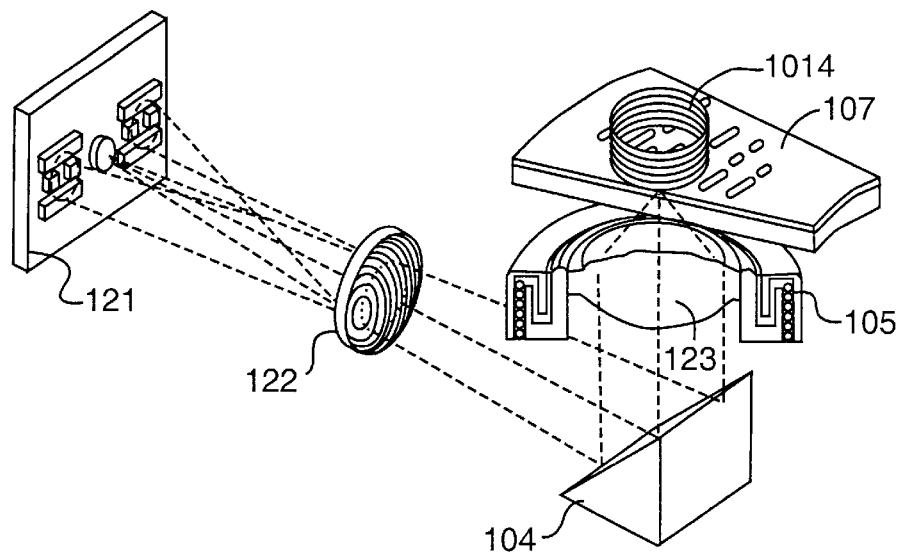
FIG. 15 is a diagram showing a second embodiment of a magneto-optical head based upon the present invention.

FIG. 15 shows a second embodiment of a magneto-optical head based on the present invention. A linearly polarized light beam emitted from a semiconductor laser placed in the center of a module 121 having the semiconductor laser and an optical detector unified therein is transmitted through a refractive type polarizing diffraction grating 122 of the present invention, reflected at a 45° reflector 104 and condensed into a magneto-optical recording medium 107 through an objective lens for finite-conjugate optical system 123 built in a lens actuator 105.

The refractive type polarizing diffraction grating 122 based on the present invention has a lens action for a diffracted light beam. Since the refractive type polarizing diffraction grating 122 is a diffraction grating, the polarizing diffraction grating 122 does not have a lens action for a 0$^{th}$ order light beam and therefore, makes +nth order diffracted light beam and −nth order diffracted light beam focus on a jointly useful position.

A diffraction grating having the above lens action is required to be configured by a grating pattern of a curved line condition as well as a generally known Fresnel's lens. The grating pattern is produced by a row of an identical circle arc or a concentric circle having an identical center of their curvatures, a sectional plane structure perpendicular to the direction along the grating pattern is shrunk in the direction perpendicular to the direction along the grating pattern in a grating plane while having a distance from the A center of its curvature and the grating pattern has a structure in which a grating interval is in inverse proportion to the distance from the center of its curvature.

In a projected path of a light beam, although an unnecessary diffracted light beam is generated by a refractive type polarizing diffraction grating 122, since a focus point of a diffracted light beam can be shifted largely from a 0$^{th}$ order light beam and a reflected light beam by an unnecessary diffracted light beam rarely comes back to an optical detector because of the refractive type polarizing diffraction grating 122 having a lens action, the unnecessary diffracted light beam does not influence at all.

However, the above unnecessary diffracted light beam would be a big trouble for a three beam Wollaston prism not having a lens action. The description of the three beam Wollaston prism is given later.

A light beam reflected by a recording layer of a magneto-optical recording medium 107 rotates in the reverse direction a polarized light beam direction of its linearly polarized light beam dependent on whether or not a magnetic recording domain presents and transfers a recording information.

The reflected light beam is incident on the refractive type polarizing diffraction grating 122 via an objective lens for finite-conjugate optical system 123 and a 45° reflector 104. Although 0$^{th}$ order light beam comes back to a semiconductor laser, a component of a linearly polarized light beam of the direction making +45°, −45° to the polarized light beam direction of emitted linearly polarized light beam from the semiconductor laser becomes +1$^{st}$ order diffracted light beam, −1$^{st}$ order diffracted light beam and is detected by the respective optical receiving portion in a semiconductor laser optical detector unified module 121.

Because the refractive type polarizing diffraction grating 122 has a lens action, +1$^{st}$ order diffracted light beam makes a focus before a detection plane and −1$^{st}$ order diffracted light beam is irradiated to make a focus after the detection plane because of its jointly useful light beam for its refractive light beam. Accordingly, a focusing detection by a beam size method can be performed simultaneously with a tracking signal detection by a push-pull method. A magneto-optical signal can be obtained from a difference of an amount of a detected light beam for +1$^{st}$ order diffracted light beam and −1$^{st}$ order diffracted light beam.

In an embodiment of the present invention, since a reflected light beam condensed in advance by the objective lens for finite-conjugate optical system 123 is incident on the refractive type polarizing diffraction grating 122, +1$^{st}$ order diffracted light beam and −1$^{st}$ order diffracted light beam focus on the identical side for the refractive type polarizing diffraction grating 122, and a distance between a grating plane of the refractive type polarizing diffraction grating 122 and a focus point of +1$^{st}$ order diffracted light beam is different from a distance between a grating plane of the refractive type polarizing diffraction grating 122 and a focus point of −1$^{st}$ order diffracted light beam.

An optical axis of an incident light beam from a laser optical source for the refractive type polarizing diffraction grating 122 and an optical axis of a reflected light beam from a magneto-optical recording medium 107 are necessary to be located in the position outside of a center of its curvature when a grating pattern is made by a row of an identical circle arc and are necessary to be located in the position outside of a center of a concentric circle when a grating pattern is made by the concentric circle. If the optical axis matches with the center of its curvature and/or the center of the concentric circle, a detection of a diffracted light beam can not be performed because an optical axis of the diffracted light beam matches with a 0$^{th}$ order light beam.

In an embodiment of the present invention, an optical detector is placed on the identical side for a grating plane of the refractive type polarizing diffraction grating 122. In the configuration using the conventional beam splitter and the polarized light prism, although the width of an apparatus is required to be kept because of splitting an optical path of the reflected light beam by 90°, it is unnecessary to keep the width of the apparatus by using the embodiment of the invention and possible to miniaturize the apparatus. Since a common-path optical system placed a laser optical source on the bisector of +1$^{st}$ order diffracted light beam and −1$^{st}$ order diffracted light beam is provided, miniaturization is available.

Figure 16:
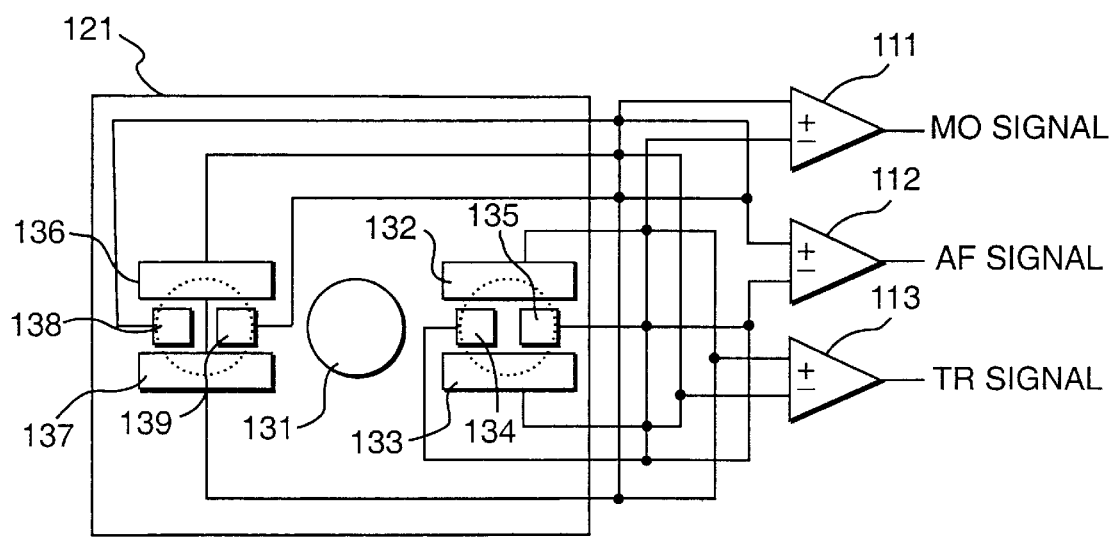
FIG. 16 is a circuit diagram describing a signal detection method of the second embodiment of a magneto-optical head based upon the present invention.

FIG. 16 shows a circuit diagram describing a signal detection method in the second embodiment of a magneto-optical head shown in FIG. 15. A semiconductor laser 131 is prepared in the center of a semiconductor laser optical detector unified module 121. Although a surface emitting type is preferred for the semiconductor laser 131, it is acceptable to mount the conventional semiconductor laser chip having a construction of Fabry-Pelot interferometer and a 45° reflector in the hybridized manner. There is provided optical receiving areas on both sides of the semiconductor laser 131 for detecting a diffracted light beam by a polarizing diffraction grating.

An optical receiving area to receive +1$^{st}$ order diffracted light beam on the right side of FIG. 16 includes optical receiving areas useful for a tracking signal detection 132, 133 and optical receiving areas useful for a focusing signal detection 134, 135. An optical receiving area to receive −1$^{st}$ order diffracted light beam on the left side of FIG. 16 includes optical receiving areas useful for a tracking signal detection 136, 137 and optical receiving areas useful for a focusing signal detection 138, 139. A focusing signal can be obtained by calculating the difference between a sum of an output from the optical receiving areas useful for a focusing signal detection 134, 135 and sum of an output from the optical receiving areas useful for a focusing signal detection 138, 139 through a differential amplifier 112. A tracking error signal can be obtained by calculating the difference between a sum of an output from the optical receiving areas useful for a tracking signal detection 132, 137 and sum of an output from the optical receiving areas useful for a tracking signal detection 133, 136 through a differential amplifier 113. Because a magneto-optical signal takes a difference between +1$^{st}$ order diffracted light beam and −1$^{st}$ order diffracted light beam, the magneto-optical signal can be obtained by calculating a difference between a sum of an output from the optical receiving areas 132, 133, 134, 135 and sum of an output from the optical receiving areas 136, 137, 138, 139 through a differential amplifier 111.

In FIG. 13, it is possible to abbreviate a cylindrical lens 109 by switching a polarizing diffraction grating 108 in which a grating is linear with a polarizing diffraction grating 122 in which a grating is a curved line and using a beam size method.

Figure 17:
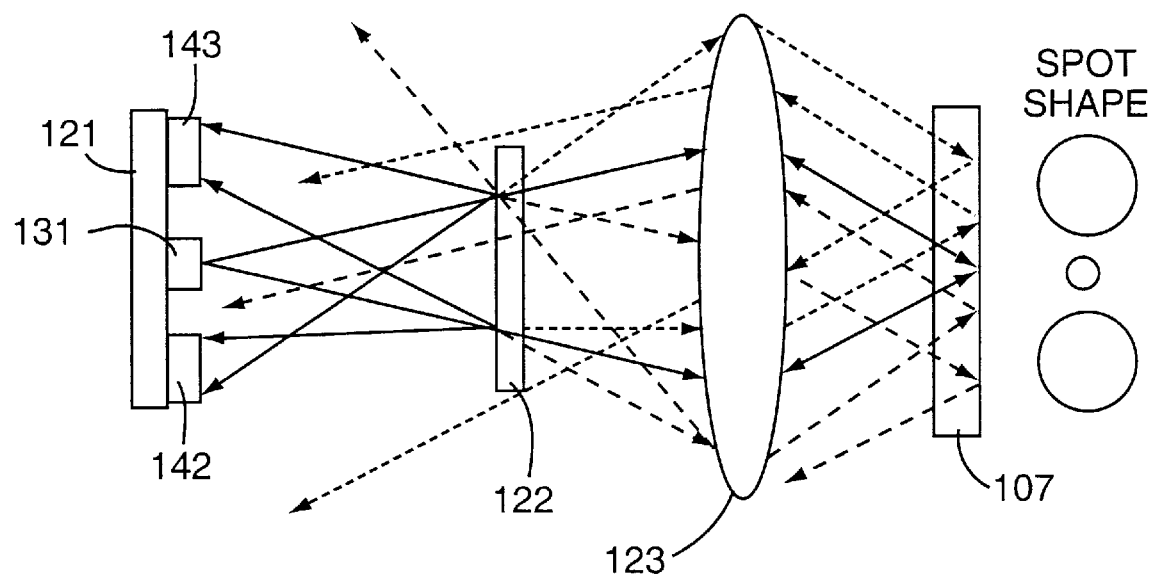
FIG. 17 is a diagram showing that there is no influence of a diffracted light beam on a projected path when a diffraction grating of a curved line condition based upon the present invention is used.

FIG. 17 shows a diagram describing where a diffracted light beam goes when a light beam output from a semiconductor laser 131 in the embodiment of FIG. 15 and directed to an optical disk 107 is diffracted at a polarizing diffraction grating 122. Because a polarizing diffraction grating 122 has aforementioned lens action, a diffracted light beam causes a focusing shift largely on the optical disk 107. Accordingly, a reflected light beam further causes a focusing shift largely and does not influence an amount of a light beam received by detectors 142 and 143.

Figure 18:
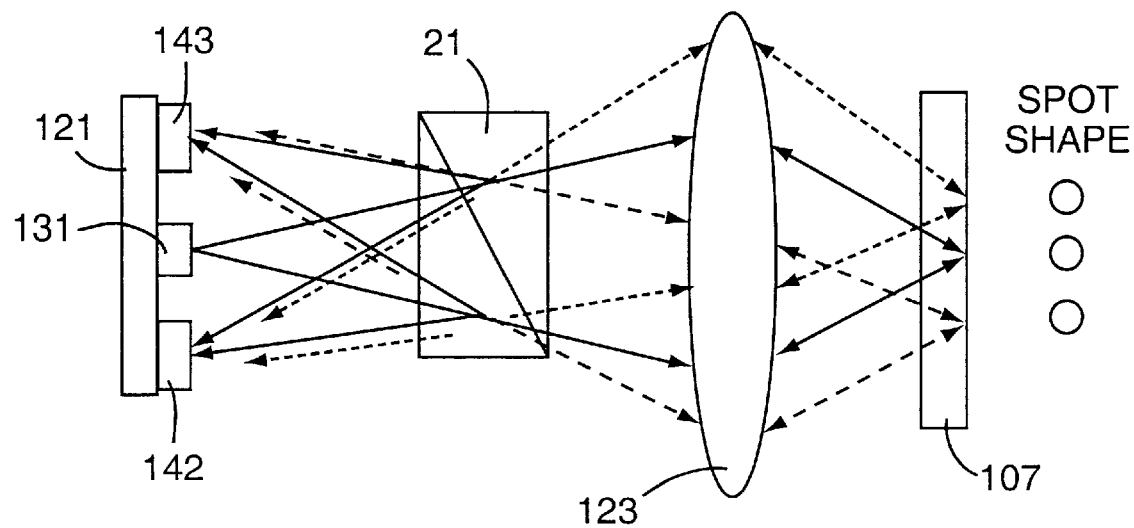
FIG. 18 is a diagram describing a problem when the embodiment of FIG. 15 using a three beam Wollaston prism is realized.

On the other hand, if an embodied configuration shown in FIG. 15 by using a three beam Wollaston prism 21 is realized, there is a problem described by using FIG. 18.

Because the three beam Wollaston prism 21 does not have a lens action, if a part of a light beam output from the semiconductor laser 131 and directed to the optical disk 107 is split, the part of the light beam focuses on the disk 107 as well as a central main beam does. Accordingly, because a reflected light beam returns by following the same optical path as a projected path, the optical path of the reflected light beam overlaps with an optical path of a polarized split light beam of the main beam (as shown) and a part of the reflected light beam is received by the optical detectors 142 and 143. Because the part of the reflected light beam acts as noise for a generated signal, that causes a deterioration of a signal quality.

Figure 19:
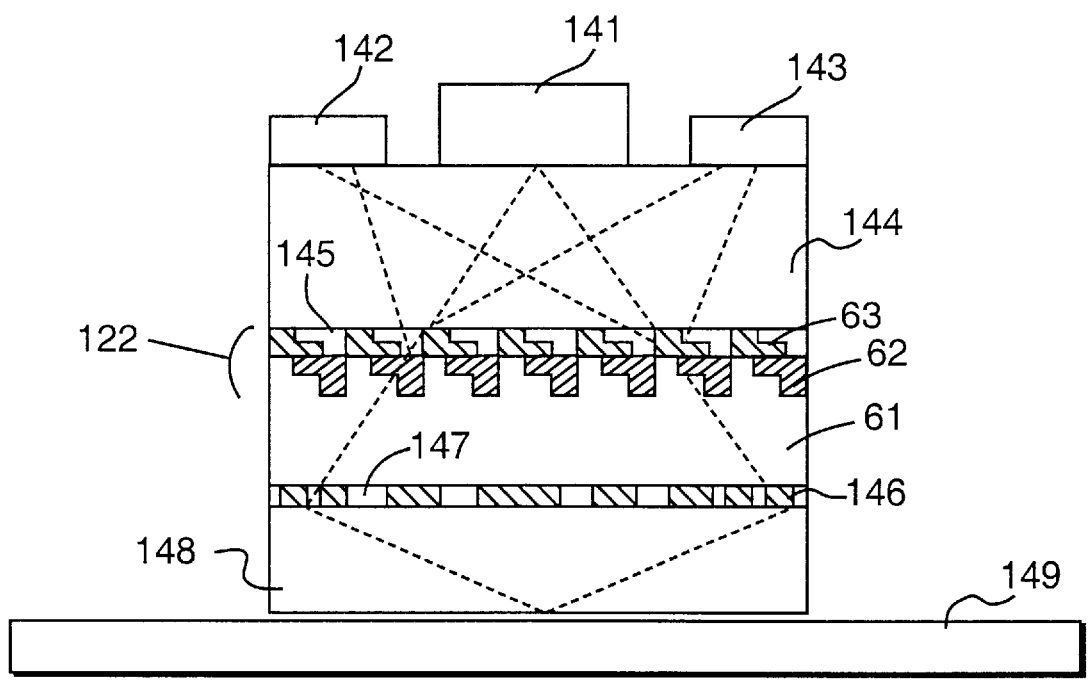
FIG. 19 is a diagram showing a third embodiment of a magneto-optical head based upon the present invention.

FIG. 19 shows an embodiment when a magneto-optical head of the present invention is produced by using an exposure development process through a photo-mask employed generally in a semiconductor manufacturing process.

A surface emitting laser diode 141 and photo-detectors 142, 143 are produced by layering gallium nitride on a substrate 144 such as a sapphire crystal. A refractive index variation layer 62 of a staircase condition is produced on an anisotropic crystal substrate 61 such as a lithium niobate by using a method of an ion exchange, a grating pattern 63 using an isotropic medium and a refractive type polarizing diffraction grating 122 having a curved line pattern shown in FIG. 15 are produced on the surface of the substrate 61.

A condensed grating 146 using an isotropic medium is produced on the reverse side of the substrate 61 and provided as an objective lens. The surface emitting laser diode substrate and the polarizing diffraction grating substrate are unified by using a transparent substrate 148 and transparent resin glues 145 and 147.

In a magneto-optical head made in the above manner, a light beam from a surface emitting laser diode 141 is transmitted through a polarizing diffraction grating as well as the embodiment of FIG. 15 and is condensed on the bottom surface of the transparent substrate 148 by the grating objective lens 146. The magneto-optical head itself is placed adjacent to a distance less than a quarter of an optical wavelength by a floating slider used generally in the current magnetic disk for a magneto-optical recording medium 149 whose surface has a magneto-optical recording layer. A light beam of incident angle reflected entirely at the bottom of a transparent substrate can contribute to a recording information read-out of magneto-optical recording medium 149 as an evanescent wave.

Accordingly, even if an air layer is put between the transparent substrate 148 and the magneto-optical recording medium 149, it is possible to generate a signal in the condensed spot of the inner transparent substrate 148.

This method is called Solid Immersion by an analogy to the method for the resolution improvement called Immersion generally known in a microscope.

A reflected light beam reading out an information of a magnetic recording domain of the magneto-optical recording medium 149 as a polarized light beam rotation is diffracted at the refractive type polarizing diffraction grating 122 and $\pm 1^{st}$ order diffracted light beam is led to optical detectors 142 and 143.

These diffracted light beams are +45°, −45° components of linearly polarized light beam relative to the polarized light beam direction of an emitting light beam of a semiconductor laser and a magneto-optical generation signal can be obtained from a differential output of an amount of a light beam received.

A focusing signal and a tracking error signal can be obtained by using the optical receiving area pattern described in FIG. 16.

Because a position adjustment by a photo-mask and a configuration for miniaturizing a whole head by an exposure development process are available, it is possible to mount a whole magneto-optical head of the present invention on an actuator.

A closed loop control is performed by feeding back the tracking error signal to the actuator.

On the other hand, although the focusing signal is obtained, a focusing control becomes unnecessary by controlling a height of a magneto-optical head through the use of a floating slider. However, if a polarizing diffraction grating has a linear pattern, not only is an unnecessary condensed spot generated on a disk by the diffraction in a projected path but also there arises a problem that reflected light beam of the diffracted light beam is mixed into an optical detector and therefore, it is desirable to make the polarizing diffraction grating change to a refractive type polarizing diffraction grating having a curved pattern.

In aforementioned examples, although all unification is done by including the surface emitting laser diode 141 and photo-detectors 142, 143, it is unnecessary to be limited to them and acceptable to prepare a laser separately. Although the condensed grating 146 is produced on the reverse side of the refractive type diffraction grating 122 having a grating of a curved pattern, unification of all devices 141, 142, 143 and 146 may be done after producing the respective devices separately.

Based upon the above examples, an optical axis adjustment of pluralities of optical heads can be performed all at once by the position adjustment of the pattern of the photomask and this adjustment method is suitable for the mass production because it is unnecessary to perform an individual optical axis adjustment in the conventional manner.

According to the present invention, in a polarizing diffraction grating which can be produced by an exposure development process through the photo-mask that has an advantage for the mass production ability, it is easy to: miniaturize and design freely its splitting ratio and its splitting angle; differentiate a polarized light beam status of $\pm 1^{st}$ order diffracted light beam; obtain a magneto-optical signal from a differential output of the respective detected optical amount; use a $0^{th}$ order light beam for the servo signal detection; and place a semiconductor laser optical source on a central optical axis of $\pm 1^{st}$ order diffracted light beam.

Accordingly, it is capable of realizing simply a magneto-optical head being miniaturized, having the least parts and being easy for the mass production.

What is claimed is:

1. A diffraction grating, for diffracting a coherent polarized incident light beam, said incident light beam having first and second polarized components, comprising:

a plurality of light transmitting mediums forming an asymmetrical optical grating pattern, wherein at least one of the mediums has a refractive index that is different dependent on first and second polarizing directions of the incident light beam to generate separated ±nth order diffracted light beams from each said first and second polarized incident light beam components, where n is a natural number;

in a sectional plane perpendicular to a direction along said grating pattern, said grating pattern having a staircase shape boundary line between said mediums with a width of respective stages of said staircase shape being varied;

said grating pattern having a diffraction efficiency of +nth order diffracted light of the first polarized light beam component that is larger than a diffraction efficiency of −nth order diffracted light of said first polarized light beam component by an amount hat is sufficient to detect a magneto-optical signal from +nth order diffracted light and −nth order diffractive light; and said grating pattern having a diffraction efficiency of +nth order diffracted light of the second polarized light beam component that is smaller than a diffraction efficiency of −nth order diffracted light of said second polarized light beam component by an amount that is sufficient to detect a magneto-optical signal from +nth order diffracted light and −nth order diffracted light.

2. The diffraction grating of claim 1, wherein a polarized light direction of said +nth order diffracted light and a polarized light direction of said −nth order diffracted light cross each other orthogonal in each of the plus and minus diffracted orders, the polarization states of the respective first and second light polarized light beam components being mutually orthogonal for each of said light beams.

3. The diffraction grating of claim 2, wherein the diffraction efficiency of the +nth order diffracted light of said first polarized light beam component is identical to the diffraction efficiency of the −nth order diffracted light of said second polarized light beam component, and the diffraction efficiency of the −nth order diffracted light of said first polarized light beam component is identical to the diffraction efficiency of the +nth order diffracted light of said second polarized light beam component.

4. The diffraction grating of claim 3, wherein the diffraction efficiency of the −nth order diffracted light of said first polarized light beam component and the diffraction efficiency of the +nth order diffracted light of said second polarized light beam component are substantially zero.

5. The diffraction grating of claim 2, wherein the diffraction efficiency of the −nth order diffracted light of said first polarized light beam component and the diffraction efficiency of the +nth order diffracted light of said second polarized light beam component are substantially zero.

6. A diffraction grating, for diffracting an incident light beam, comprising:

at least three different light transmitting mediums, with two of said mediums forming an asymmetrical optical grating pattern having a refractive index at the boundary between said two mediums that is different dependent on an incident polarized light beam direction to generate at least first and second separated light beams from the incident light beam;

in a sectional plane perpendicular to a direction along said grating pattern, said grating pattern having a boundary line between said mediums that is periodic in shape for the direction perpendicular to the direction along said grating pattern in a grating plane, and said boundary line does not have a plane of symmetry perpendicular to both of said grating plane and said sectional plane;

wherein said periodic shape changes in period continuously in the direction perpendicular to the direction along said grating pattern in said grating plane in at least a limited part so that said boundary line does not have a symmetrical plane perpendicular to both of said grating plane and said sectional plane.

7. The diffraction grating of claim 6, wherein one of said two mediums is air.

8. The diffraction grating of claim 6, wherein a shape of said boundary line is one of a staircase and a saw tooth.

9. The diffraction grating of claim 6, wherein a shape of said boundary line is one of a staircase and a saw tooth.

10. The diffraction grating of claim 6, further including a second grating pattern formed from another two of said mediums so that the incident light beam passes through both of said grating patterns.

11. The diffraction grating of claim 10, wherein said second grating pattern is one of on and below a grating plane of said area of said first mentioned grating pattern; and said second grating pattern is periodic in shape for the direction perpendicular to the direction along said second grating pattern in a grating plane so that a refractive index distribution of a sectional plane perpendicular to the direction along said second grating pattern does not have a symmetrical plane perpendicular to both of said grating plane and said sectional plane.

12. The diffraction grating of claim 11, wherein one of said grating patterns has a period that changes continuously in a direction perpendicular to the direction along said grating pattern in said grating plane in at least a limited part so that a refractive index distribution of a sectional plane perpendicular to the direction along said grating pattern does not have a symmetrical plane perpendicular to both of said grating plane and said sectional plane.

13. The diffraction grating of claim 11, wherein a sectional plane shape of said second grating pattern is one of a staircase and a saw tooth.

14. The diffraction grating of claim 6, wherein one of said two mediums is a substrate and the other of said two mediums is produced from an area of said substrate.

15. The diffraction grating of claim 6, wherein a shape of said boundary line is one of a staircase and a saw tooth.

16. The diffraction grating of claim 6, wherein said grating pattern generates and optically focuses +nth order diffracted light and −nth order diffracted light from said light beam to different focal points at substantially different distances respectively from a grating plane.

17. A magneto-optical head for reading information from a magneto-optical information medium with a light beam, comprising:

an asymmetrical optical diffraction grating in a path of the light beam reflected from the information medium and having optical mediums with a refractive index between said optical mediums that is different dependent on an incident polarized light beam direction;

a plurality of optical detectors for receiving said reflection light from a magneto-optical recording medium after passing through said diffraction grating, wherein said plurality of optical detectors have a first optical receiving area for detecting +nth order diffracted light from said diffraction grating for at least a natural number n, a second optical receiving area for detecting −nth order diffracted light from said diffraction grating and a magneto-optical signal can be detected based on a differential output from said first optical receiving area and said second optical receiving area, wherein said diffraction grating has a grating pattern having one of a row of identical circle arcs and concentric circles;

said diffraction grating has focus points at different distances from a grating plane for the +nth order diffracted light and the −nth order diffracted light;

said first optical receiving area and said second optical receiving area are separated from said grating plane by an average of the distances of said focal points of said +nth order diffracted light and said −nth order diffracted light; and a laser optical source mounted on a bisector of optical axes of said +nth order diffracted light and said −nth order diffracted light and a laser projection optical axis that is not central with respect to a center of curvature of said grating pattern.

18. A magneto-optical head for reading information from a magneto-optical information medium with a light beam, comprising:

an asymmetrical optical diffraction grating in a path of the light beam reflected from the information medium and having optical mediums with a refractive index between said optical mediums that is different dependent on an incident polarized light beam direction;

a plurality of optical detectors for receiving said reflection light from a magneto-optical recording medium after passing through said diffraction grating, wherein said plurality of optical detectors have a first optical receiving area for detecting +nth order diffracted light from said diffraction grating for at least a natural number n, a second optical receiving area for detecting −nth order diffracted light from said diffraction grating and a magneto-optical signal that can be detected based on a differential output from said first optical receiving area and said second optical receiving area wherein there are two of said diffraction gratings that split the light beam into a first optical beam and a second optical beam respectively, each of whose polarized light direction crosses orthogonal for said +nth order diffracted light and said −nth order diffracted light;

wherein said first optical receiving and said second optical receiving areas are on the same side of a grating plane of said diffraction grating; and wherein said first optical receiving area and said second optical receiving area are on a single flat surface parallel with said grating plane, including a laser optical source mounted on a bisector of optical axes of said +nth order diffracted light and said −nth order diffracted light and a laser projection optical axis that is not central with respect to a center of curvature of said grating pattern.

19. A magneto-optical head of claim 18, including a laser optical source generating the light beam;

wherein said first optical receiving area, said second optical receiving area and said laser optical source are placed on the same side of a grating plane of said diffraction grating; and wherein said first optical receiving area, said second optical receiving area and said laser optical source, and said diffraction grating are integrated circuits on said flat surface.

20. A magneto-optical head of claim 19, wherein said plurality of optical detectors include a third optical receiving area for detecting a $0^{th}$ order light of said diffraction grating.

21. A method for detecting a magneto-optical signal, the method comprising the steps of:

passing an incident light beam through an asymmetrical grating pattern having a refractive index across a staircase boundary, in a sectional plane perpendicular to a direction along the grating pattern, which boundary is between different mediums and which refractive index is dependent on an incident polarized light direction;

reflecting light from a magneto-optical recording medium to be the incident light beam on the diffraction grating;

generating +nth order diffracted light and -nth order diffracted light by said diffraction grating from the incident light beam reflected from the magneto-optical recording medium; and optically detecting a magneto-optical signal based upon +nth order diffracted light and -nth order diffracted light generated by said diffraction grating from the incident light beam reflected from the magneto-optical recording medium, for a natural number n, including focusing said light beam with an optical lens provided by a curved grating pattern of said diffraction grating, having one of a center of curvature for a row of identical circle arcs and concentric circles, to focus at focal points that are a different distance from a grating plane for each of the +nth order diffracted light and the -nth order diffracted light;

detecting the +nth order diffracted light and the -nth order diffracted light at a position separated from said grating plane by an average of the distances to said focal points of the +nth order diffracted light and the -nth order diffracted light; and generating the light beam from a laser optical source placed on a bisector of optical axes of the +nth order diffracted light and the -nth order diffracted light and on a laser beam optical axis that does not intersect one of the centers of its curvature and the center of said concentric circle.

22. The method of claim 21, wherein said detecting said +nth order diffracted light and said -nth order diffracted light and generating the light beam from a laser optical source are in a common flat plane on a side of a grating plane of said diffraction grating.

23. The method of claim 22, wherein said common flat plane is parallel with a grating plane of the diffraction grating.

24. The method of claim 21, wherein said detecting said +nth order diffracted light and said -nth order diffracted light and said generating are in a common flat plane in parallel with said grating plane.

* * * * *